United States Patent
Lee et al.

(10) Patent No.: US 9,809,670 B2
(45) Date of Patent: Nov. 7, 2017

(54) NITRILE RUBBER AND METHOD OF PREPARING THE SAME

(71) Applicant: LG Chem, Ltd., Seoul (KR)

(72) Inventors: Se Eun Lee, Daejeon (KR); Dong Jo Ryu, Daejeon (KR); Seon Hee Han, Daejeon (KR); Jeong Heon Ahn, Daejeon (KR); Hee Jung Jeon, Daejeon (KR); Jeong Hoon Jo, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/421,205

(22) PCT Filed: Jun. 24, 2014

(86) PCT No.: PCT/KR2014/005543
§ 371 (c)(1),
(2) Date: Feb. 12, 2015

(87) PCT Pub. No.: WO2015/005597
PCT Pub. Date: Jan. 15, 2015

(65) Prior Publication Data
US 2015/0191563 A1    Jul. 9, 2015

(30) Foreign Application Priority Data

Jul. 9, 2013  (KR) .................. 10-2013-0080277
Jun. 12, 2014 (KR) .................. 10-2014-0071217

(51) Int. Cl.
C08F 236/12   (2006.01)
C08K 5/09     (2006.01)
(Continued)

(52) U.S. Cl.
CPC .............. *C08F 236/12* (2013.01); *C08K 5/09* (2013.01); *C08K 5/14* (2013.01); *C08K 5/37* (2013.01); *Y10T 428/139* (2015.01)

(58) Field of Classification Search
CPC .... C08F 236/00; C08F 236/12; Y10T 428/13; Y10T 428/139; Y10T 428/1352;
(Continued)

(56) References Cited

U.S. PATENT DOCUMENTS 5,362,787 A * 11/1994 Ngoc .................... C08F 236/12
                                                           524/297
5,627,250 A *  5/1997 Tsuji ................... C08F 236/12
                                                           264/328.2
(Continued)

FOREIGN PATENT DOCUMENTS

KR    20050053768 A    6/2005
KR    20100022076 A    2/2010
(Continued)

OTHER PUBLICATIONS

International Search Report and Written Opinion for Application No. PCT/KR2014/005543 dated Oct. 27, 2014.
(Continued)

*Primary Examiner* — Lee E Sanderson
(74) *Attorney, Agent, or Firm* — Lerner, David, Littenberg, Krumholz & Mentlik, LLP

(57) ABSTRACT

Disclosed are nitrile rubber and a method of preparing the same. The nitrile rubber contributing to an excellent polymerization rate and vulcanization rate and having advantageous processability during vulcanization, and a method of preparing the same are disclosed.

9 Claims, 1 Drawing Sheet

(51) Int. Cl.
*C08K 5/14* (2006.01)
*C08K 5/37* (2006.01)

(58) Field of Classification Search
CPC .... C08K 5/09; C08K 5/14; C08K 5/37; C08C 19/02; C08L 15/00; C08L 15/005; C08L 33/04; C08L 9/02; C08L 9/04
USPC ........ 428/34.1, 35.2, 35.7–35.9, 36.9, 36.91, 428/36.92; 521/140, 148; 524/430, 521, 524/565; 525/55, 233, 234, 328.3, 329.1, 525/329.3, 329, 7, 331.9, 387
See application file for complete search history.

(56) References Cited

U.S. PATENT DOCUMENTS

| | | | |
|---|---|---|---|
| 6,548,604 B1* | 4/2003 | Kotsuji | C08C 19/02 525/328.3 |
| 7,262,244 B2 | 8/2007 | Guerin | |
| 7,923,518 B2 | 4/2011 | Obrecht | |
| 2002/0045691 A1* | 4/2002 | Konno | C08F 236/12 524/265 |
| 2005/0085593 A1* | 4/2005 | Tsukada | C08F 279/02 525/329.7 |
| 2008/0293868 A1* | 11/2008 | Obrecht | C08C 1/14 524/439 |
| 2013/0029069 A1 | 1/2013 | Soddemann et al. | |
| 2014/0124986 A1 | 5/2014 | Lima et al. | |

FOREIGN PATENT DOCUMENTS

| | | |
|---|---|---|
| KR | 101098683 | 12/2011 |
| KR | 20120061946 A | 6/2012 |
| WO | 2013000890 A1 | 1/2013 |

OTHER PUBLICATIONS

Written Opinion for Application No. PCT/KR2014/005543 dated Oct. 27, 2014.

* cited by examiner

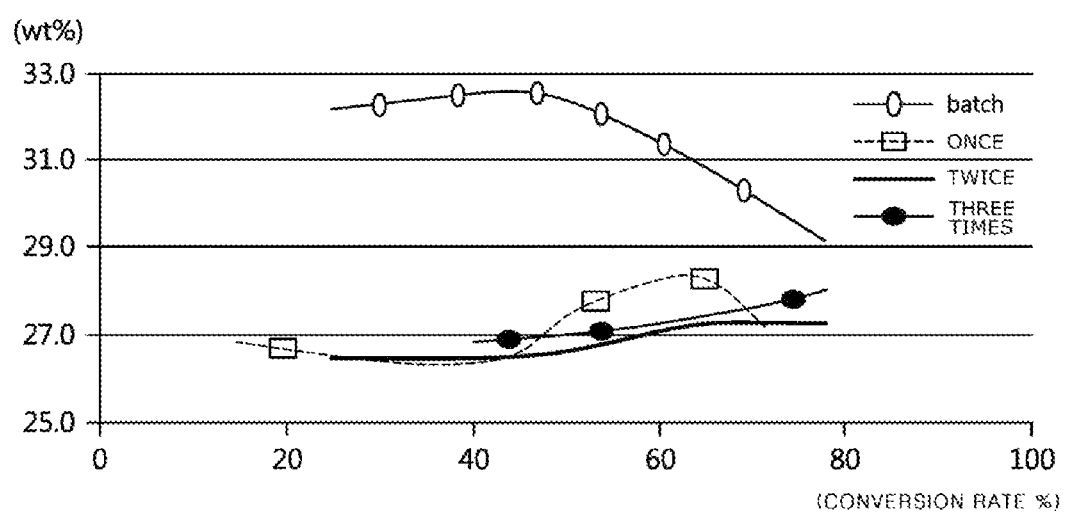

NITRILE RUBBER AND METHOD OF PREPARING THE SAME

CROSS-REFERENCE TO RELATED APPLICATION

This application is a national phase entry under 35 U.S.C. §371 of International Application No. PCT/KR2014/005543, filed Jun. 24, 2014, which claims priority to Korean Patent Application No. 10-2013-0080277, filed on Jul. 9, 2013 and Korean Patent Application No. 10-2014-0071217, filed on Jun. 12, 2014, the disclosures of which are incorporated herein by reference.

TECHNICAL FIELD

The present invention relates to nitrile rubber and a method of preparing the same. More particularly, the present invention relates to nitrile rubber contributing to an excellent polymerization rate and vulcanization rate, and having advantageous processability during vulcanization, and a method of preparing the same.

BACKGROUND ART

In general terms, nitrile rubber is a copolymer of acrylonitrile and butadiene, wherein a bonding amount of acrylonitrile is 15~50%, and acrylonitrile and butadiene are randomly copolymerized.

The primary advantage of nitrile rubber is excellent oil resistance due to polarity of a nitrile group in acrylonitrile. The property greatly depends on the amount of bonded nitrile. In a relation between the amount of the bonded nitrile and swelling, and in a relation between an aniline point of oil (lowest temperature at which hydrocarbon is completely dissolved in aniline having volume identical to the volume of hydrocarbon, ingredients of hard mineral oil such as gasoline may be confirmed by measuring an aniline point) and swelling, oil resistance is improved with increasing the amount of bonding nitrile and swelling is reduced with increasing an aniline point. Oil referred in the present invention means mineral oil having a petroleum-based hydrocarbon structure and is broadly used as a lubricant or a hydraulic oil of an oil pressure gauge.

Since such oils contain a variety of additives which may affect oil function, oil resistance of rubber at an aniline point is preferably assessed and the oils are used after measuring physical properties or swelling of oil used as a seal. In addition, when a compression permanent set test of an O ring was performed for long time in high-temperature oil, it was assumed that nitrile rubber had excellent characteristics, and nitrile rubber having volume changing in a certain range had better sealability, when compared to nitrile which showed good rubber properties but the volume of which was reduced. In this way, nitrile rubber has excellent oil resistance and thereby is ideally suited to use as an O ring, a V packing, and an oil seal to seal a lubricant, hydraulic fluid, a fuel oil and the like in fields such as industrial equipment, construction equipment, labor-saving machines, vehicles, aircrafts and the like, and, accordingly, is used the most abundantly. Although a temperature, at which nitrile rubber may be used, greatly depends on a combination condition, generally used temperature is −50 to −120 and, in particular, low-content nitrile rubber is used in machines or aircrafts for operation in cold environments.

In addition, relatively high-content nitrile rubber exhibits superior heat-resistance or mechanical properties and excellent gas permeability, and thereby may be used for vacuum down to approximately 10 torr. The relatively high-content nitrile rubber is polymerized through conventional low-temperature emulsion polymerization and is handled in a bale type after passing through a solidification process using a cohesive agent. However, requirements for cold-resistance of vehicle components are becoming more strictly and thereby demand for low-content nitrile rubber are increasing. However, the low-content nitrile rubber exhibits poor processability and a slow vulcanization rate. Therefore, there is a need to address the above problems.

DISCLOSURE

Technical Problem

Therefore, the present invention has been made in view of the above problems, and it is one object of the present invention to provide nitrile rubber having low nitrile content, contributing to an excellent polymerization rate and vulcanization rate, and having advantageous processability during vulcanization of nitrile rubber, and a method of preparing the same.

Technical Solution

In accordance with one aspect of the present invention, provided is nitrile rubber comprising 18 to 32 parts by weight of at least one α,β-unsaturated nitrile monomer and 82 to 68 parts by weight of at least one conjugated diene monomer based on 100 parts by weight of the nitrile rubber, wherein ΔACN is 3 or less.

In accordance with another aspect of the present invention, provided is a method of preparing nitrile rubber comprising emulsion polymerizing at least one α,β-unsaturated nitrile monomer of 18 to 32 wt % and at least one conjugated diene monomer of 82 to 68 wt %, wherein (i) the α,β-unsaturated nitrile monomer is divided added at an initial step of polymerization and during polymerization and the addition during polymerization is performed once to twice within 1.5 to 3.5 hours and then once to twice within 4 to 6 hours, after polymerization initiation, and the emulsion polymerization is performed in the presence of fatty acid, alkyl thiol, and oil-soluble peroxide.

In accordance with another aspect of the present invention, provided is a vulcanizable mixture comprising the nitrile rubber and at least one crosslinker.

In accordance with yet another aspect of the present invention, provided are a method of preparing a rubber base molding and a molded product obtained from the same, wherein the nitrile rubber or the vulcanizable mixture is vulcanized during a molding process to prepare a molded product.

Hereinafter, the present invention will be described in detail.

In particular, in the present invention, 18 to 32 parts by weight of at least one α,β-unsaturated nitrile monomer, and 82 to 68 parts by weight of at least one conjugated diene monomer are comprised based on 100 parts by weight of the nitrile rubber, wherein Δ ACN is 3 or less.

The term of "Δ ACN" used in the present invention, so long as it is not particularly specified, indicates a difference of ACN distributions calculated from a value which obtained by calculating ACN contents of an initiation point and an end point by applying the Gordon-Taylor equation using DSC, based on each of the initiation point and the end point by a formula below, in which a glass transition temperature, and the initiation point and the end point of the glass transition temperature are determined according to ASTM E 1356-03 or DIN 11357-2 using DSC.

$$Tg=1.4564*[ACN]-77.147, \Delta ACN = \text{End point of } ACN - \text{Initiation point of } ACN$$

The α,β-unsaturated nitrile monomer, for example, may be at least one selected from the group consisting of acrylonitrile, methacrylonitrile, fumaronitrile, α-chloronitrile and α-cyanoethyl acrylonitrile.

The α,β-unsaturated nitrile monomer, for example, may be present in an amount of 18 to 32 parts by weight, 18 to 29 parts by weight, 22 to 32 parts by weight, or 18 to 22 parts by weight, based on 100 parts by weight of nitrile rubber.

The conjugated diene monomer, for example, may be at least one selected from the group consisting of 1,3-butadiene, 2,3-dimethyl-1,3-butadiene, 2-ethyl-1,3-butadiene, 1,3-pentadiene, and isoprene.

The conjugated diene monomer, for example, may be present in an amount of 82 to 68 parts by weight, 82 to 71 parts by weight, 78 to 68 parts by weight, or 82 to 78 parts by weight based on 100 parts by weight of the nitrile rubber.

In the nitrile rubber, content change of the α,β-unsaturated nitrile monomer (LAN) during polymerization for example, may be 3 or less, or 2 or less (See FIG. 1). As another embodiment, in the nitrile rubber, content change of the α,β-unsaturated nitrile monomer (LAN) may be or less when a polymerization conversion rate is less than 40%, and content change of the α,β-unsaturated nitrile monomer (LAN) may be 2 or less when a polymerization conversion rate is greater than 40%.

The nitrile rubber may comprise 0.5 to 5 parts by weight of a fatty acid based on 100 parts by weight of the nitrile rubber.

The fatty acid, for example, may be an aliphatic organic acid having 12 to 18 carbons, an aliphatic organic acid having 14 to 18 carbons, or an aliphatic organic acid having 16 to 18 carbons.

As a specific embodiment, at least one selected from the group consisting of oleic acid, rosin acid, lauric acid, myristic acid, palmitic acid, stearic acid, naphthalene sulfonic acid and eicosanoic acid may be used.

The fatty acid is present in an amount of 0.5 to 5 parts by weight or 1 to 3 parts by weight, based on 100 parts by weight of the nitrile rubber. In the above amount range, the fatty acid may function as an emulsifier.

The nitrile rubber may comprise 0.01 to 10 parts by weight of alkyl thiol based on 100 parts by weight of the nitrile rubber.

The alkyl thiol, for example, may comprise 12 to 16 carbon atoms and three or more tertiary carbon atoms, and may be at least one type comprising sulfur bond to one of the tertiary carbon atoms.

As a specific embodiment, the alkyl thiol may be at least one selected from the group consisting of 2,2,4,6,6-pentamethylheptane-4-thiol and 2,2,4,6,6,8,8-heptamethylnonane-4-thiol.

The alkyl thiol is present in an amount of 0.01 to 10 parts by weight or 0.5 to 3 parts by weight, based on 100 parts by weight of the nitrile rubber, and, in the above amount range, the alkyl thiol may effectively perform function as a molecular weight controller.

The nitrile rubber may be present in an amount of 0.01 to 1 part by weight of oil-soluble peroxide based on 100 parts by weight of the nitrile rubber.

The oil-soluble peroxide, for example, may be at least one selected from the group consisting of benzoyl peroxide, di-t-butylperoxide, azobisisobutyronitrile, tributyl hydroperoxide, dicumyl peroxide, t-butyl perbenzoate, cumene hydroperoxide, t-butyl peroctoate, methyl ethylketone peroxide, 2,5-dimethyl-2,5-di(t-butylperoxy)hexane and lauryl peroxide.

The oil-soluble peroxide is present in an amount of 0.01 to 1 part by weight or 0.01 to 0.5 part by weight based on 100 parts by weight of the nitrile rubber, and, in the above amount range, the oil-soluble peroxide may effectively function as an initiator.

In addition, the present invention comprises emulsion polymerizing 18 to 32 wt % by weight of at least one α,β-unsaturated nitrile monomer and 82 to 68 wt % by weight of at least one conjugated diene monomer, wherein (i) the α,β-unsaturated nitrile monomer is divided added at an initial step of polymerization and during polymerization, and the addition during polymerization after polymerization initiation is performed by adding once to twice within 1.5 to 3.5 hours and then by adding once to twice within four to six hours, and (ii) the emulsion polymerization is performed under presence of a fatty acid, alkyl thiol and oil-soluble peroxide.

For one embodiment, 40 to 85 wt % of the α,β-unsaturated nitrile monomer may be divided added at an initial step of polymerization and the other 60 to 15 wt % may be equally divided added during polymerization.

For another embodiment, 40 to 60 wt % of the α,β-unsaturated nitrile monomer may be divided added at an initial step of polymerization and the other 60 to 40 wt % may be equally divided added during polymerization.

The emulsion polymerization may be performed such that time required to reach a polymerization conversion rate of 80% is 7 to 8 hours at a polymerization temperature of 5 to 25+ C.

The emulsion polymerization is finished at a polymerization conversion rate of 80%, and then solidification and cleaning are performed according to conventional subsequent processes.

For one embodiment, the solidification may be performed at 50 to 100° using at least one sodium or potassium salt and 5 wt % or less of calcium chloride based on the total amount of salts used during solidification.

As a specific embodiment, the sodium or potassium salt may be at least one halide, at least one nitrate, or at least one sulfate of sodium or potassium.

As another embodiment, the solidification uses a mixture of two or more salts. Here, the salts are characterized being different salts of an identical monovalent metal or being a variety of salts of a variety of monovalent metals. In addition, at least one aging suppressor may be added before solidification or during solidification, and cleaning may be performed at 50 to 90° C.

In accordance with the present invention, the nitrile rubber obtained according to methods described above has a Mooney viscosity (ML (1+4 @100° C.)) of a 10 to 150 and a Mooney stress-relaxation rate (MSR) of 0.350 to 0.383. Here, the Mooney viscosity and the Mooney stress-relaxation rate are measured using a shearing-disc viscometer in accordance with ISO 289-4:2003E at 100° C.

A glass transition temperature (Tg) of the nitrile rubber is in a range of −70° C. to +10° C. Here, the glass transition temperature (Tg) may be measured with a differential scanning calorimeter in accordance with DIN 11357/2 or ASTM E1356-03.

In the nitrile rubber, T5 of vulcanization properties is in a range of 2.1 to 2.3 min and a vulcanization rate (Vmax) of vulcanization properties is in a range of 62.5 to 64.3 kgf·cm.

Here, the vulcanization properties may be measured using a Monsanto MDF2000 rheometer in accordance with ASTM D5289-95.

In addition, a vulcanizable mixture comprising the nitrile rubber described above and at least one crosslinker may be provided.

The mixture may comprise at least one additive selected from a filler, an activator, an ozone blocker, an aging suppressor, an antioxidant, a processing material, an extender oil, a plasticizer, a reinforcement material and a releasing agent.

Furthermore, a method of preparing a rubber-based molded product to which the nitrile rubber described above or a vulcanizable mixture is added during a molding process, and a molded product obtained therefrom may be provided.

The molded product has a tensile strength of 225 to 246 kgf/cm2, an elongation ratio of 377 to 387%, and a 300% modulus of 174 to 185. Here, the tensile strength, the elongation ratio, and the 300% modulus may be measured in a vulcanizate accordance with DIN 53 504.

The molded product may be, for example, seals, caps, hoses or diaphragms, O-ring seals, flat-type seals, corrugated seal rings, seal sleeves, seal caps, dust block caps, plug seals, insulation hoses, oil cooler hoses, inhalation hoses, servo control hoses or pump diaphragms.

Advantageous Effects

As apparent from the fore-going, the present invention advantageously provides nitrile rubber contributing to an excellent polymerization rate and vulcanization rate, and having advantageous processability. In particular, the nitrile rubber according to the present invention has a uniform monomer distribution and lower long chain branch fraction (See high MSR value), may improve a polymerization rate and a processing rate, and may have superior mechanical properties due to high vulcanization density.

DESCRIPTION OF DRAWINGS

FIG. 1 is a graph illustrating acrylonitrile content change according to conversion rate in an additional Experimental Example of each of Examples 1 and 3, and Comparative Examples 2 and 3, according to the present invention.

BEST MODE

Hereinafter, preferred examples will be provided for better understanding of the present invention. It will be apparent to those skilled in the art that these examples are only provided to illustrate the present invention and various modifications and alterations are possible within the scope and technical range of the present invention. Such modifications and alterations fall within the scope of claims included herein.

Example 1

<Example of Addition Once within 1.5 to 3.5 Hours and Addition Twice within 4 to 6 Hours after Polymerization Initiation>

78 parts by weight of 1,4-butadiene, 22 parts by weight of acrylonitrile, 3 parts by weight of oleic acid as a fatty acid, 0.45 part by weight of 2,2,4,6,6-pentamethylheptane-4-thiol as alkyl thiol, 0.05 part by weight of p-menthane hydroperoxide as oil-soluble peroxide, and 200 parts by weight of water were emulsion polymerized to prepare nitrile rubber latex.

In particular, 12 parts by weight of acrylonitrile were added before polymerization initiation and the remainder was added in three equal portions. In particular, 3.33 parts by weight of acrylonitrile were added at 2 hours, 4 hours, and 6 hours after polymerization initiation.

The polymerization was terminated when a conversion rate, in which the amount of a monomer converted into polymer is confirmed by measuring the amount of total solids, was 80% and a total reaction time was total 8 hours. The amount of acrylonitrile per each conversion rate is illustrated in FIG. 1.

Subsequently, a coagulum was obtained through a solidification process of conventional emulsion polymerization and then the coagulum was cleaned and dehydrated. Subsequently, the coagulum was cut into small pieces using a mixer and then was dried in an oven. The dried coagulum was sheeted using a roll, resulting in production of final rubber.

Each of Examples 2 and 3, and Comparative Examples 1 and 7 was carried out in the same manner as in the method of Example 1, except that time and an addition amount of acrylonitrile were divided added, and a type and the amount of a molecular weight controller were modified as disclosed in Table 1 below.

Example 2

<Example of Addition Twice within 1.5 to 3.5 Hours and Addition Twice within 4 to 6 Hours after Polymerization Initiation>

Example 2 was carried out in the same manner as in Example 1, except that 12 parts by weight of acrylonitrile was added at an early stage of polymerization and the other acrylonitrile was equally divided added in 2.5 parts by weight four times, namely, 2 hours, 3.5 hours, 5 hours and 6.5 hours after polymerization. Here, a total time taken to reach a polymerization conversion rate of 80% was total 8 hours.

Example 3

<Example of Addition Once within 1.5 to 3.5 Hours and Addition Once within 4 to 6 Hours after Polymerization Initiation>

Example 3 was carried out in the same manner as in Example 1, except that 12 parts by weight of acrylonitrile was added at an early stage of polymerization and the other acrylonitrile was equally divided added in 5 parts by weight twice, namely, 2.5 hours and 5 hours after polymerization. Here, a total time taken to reach a polymerization conversion rate of 80% was total 7 hours.

Comparative Example 1

<Example of Addition Once within 1.5 to 3.5 Hours and No Addition within 4 to 6 Hours after Polymerization Initiation>

Comparative Example 1 was carried out in the same manner as in Example 1, except that 12 parts by weight of acrylonitrile was added at an early stage of polymerization and the other acrylonitrile was added 2.5 hours after polymerization. Here, a total time taken to reach a polymerization conversion rate of 80% was total 8 hours.

Comparative Example 2

<Example of No Addition within 1.5 to 3.5 Hours and Addition Twice within 4 to 6 Hours after Polymerization Initiation>

Comparative Example 2 was carried out in the same manner as in Example 1, except that 12 parts by weight of acrylonitrile was added at an early stage of polymerization and the other acrylonitrile was added in 5 parts by weight 4 hours and 6 hours after polymerization. Here, a total time taken to reach a polymerization conversion rate of 80% was total 7.5 hours.

Comparative Example 3

<Experimental Example in which Divided Addition was not Performed>

Comparative Example 3 was carried out in the same manner as in Example 1, except that 22 parts by weight of acrylonitrile was added at an early stage of polymerization and divided addition was not performed. Here, a total time taken to reach a polymerization conversion rate of 80% was total 7 hours.

Comparative Example 4

<Experimental Example 1 in which Mercaptan was Alternatively Added and Divided Addition was not Performed>

Comparative Example 4 was carried out in the same manner as in Example 1, except that 22 parts by weight of acrylonitrile was added at an early stage of polymerization, divided addition was not performed, and alkyl thiol was substituted with 0.5 part by weight of t-dodecyl mercaptan. Here, a total time taken to reach a polymerization conversion rate of 80% was total 8.3 hours.

Comparative Example 5

<Experimental Example 2 in which Mercaptan was Alternatively Added and Divided Addition was not Performed>

Comparative Example 5 was carried out in the same manner as in Example 1, except that 22 parts by weight of acrylonitrile was added at an early stage of polymerization, divided addition was not performed, and alkyl thiol was substituted with 0.55 part by weight of n-octyl mercaptan. Here, a total time taken to reach a polymerization conversion rate of 80% was total 7.8 hours.

Comparative Example 6

<Example in which Mercaptan was Alternatively Added and Divided Addition was Performed>

Comparative Example 6 was carried out in the same manner as in Example 1, except that 0.55 part by weight of n-octyl mercaptan as a molecular weight controller was used. Here, a total time taken to reach a polymerization conversion rate of 80% was total 8.5 hours.

Comparative Example 7

<Example in which Fatty Acid Emulsifier was Alternatively Added and Divided Addition was Performed>

Comparative Example 7 was carried out in the same manner as in Example 1, except that oleic acid was substituted with rosin acid. Here, a total time taken to reach a polymerization conversion rate of 80% was total 9 hours.

Experimental Example

Properties of rubber prepared according to Examples 1 to 3 and Comparative Examples 1 to 7 were estimated as follows. Results are summarized in Table 1 below.

(1) Properties of Polymer

Mooney viscosity (MV): The Mooney viscosity of a raw polymer was measured according to DIN 53523/3 or ASTM D1646.

Mooney stress-relaxation rate (MSR): MSR was measured with a shearing-disc viscometer according to ISO 289-4:2003E at 100° C. For reference, a long chain branch fraction decreases with increasing MSR value.

Δ ACN: A glass transition temperature, and an initiation point and an end point thereof were determined using DSC according to ASTM E1356-03 or DIN 11357-2. Based on a measured initiation point and end point, ACN contents of the initiation point and the end point may be calculated by applying Gordon-Taylor relation, and a difference of ACN distribution from the calculated values may be calculated.

$Tg=1.4564*[ACN]-77.147$, $\Delta ACN$=End point of $ACN$–Initiation point of $ACN$ (2) Vulcanization Properties (MDR: Moving DieRheometer):

A vulcanization profile and analysis data related therewith were measured with a Monsanto MDF2000 rheometer according to ASTM D5289-95.

T5: Time required for 5% vulcanization was measured (160° C., 3 minutes).

Vmax (vulcanization rate): Vmax means maximum torque required for 100% vulcanization.

(3) Mechanical Properties:

Mechanical characteristics of rubber at a vulcanised state were measured according to DIN 53 504. Here, the rubber was mixed according to ASTM D3187 using a Banbury mixer.

Tensile strength (TS: tensile strength, kgf/cm2): the mixture was vulcanized for 45 minutes at 145° C. and then tensile strength of a 300% vulcanizate was measured.

Elongation ratio (elongation, %): The mixture was vulcanized for 45 minutes at 145° C. and then an elongation ratio of a vulcanizate was measured.

300% modulus: The mixture was vulcanized for 45 minutes at 145° C. and then modulus was measured at a 300% elongation state.

TABLE 1

| | | Example | | | Comparative Example | | | | | |
|---|---|---|---|---|---|---|---|---|---|---|
| | Classification | 1 | 2 | 3 | 1 | 2 | 3 | 4 | 5 | 7 |
| Properties of polymer | MV | 50 | 49 | 51 | 51 | 49 | 53 | 51 | 50 | 49 |
| | MSR | 0.350 | 0.383 | 0.35 | 0.281 | 0.287 | 0.250 | 0.301 | 0.270 | 0.34 |
| | Δ ACN | 3 | 2 | 3 | 8 | 9 | 12 | 10 | 12 | 6 |

TABLE 1-continued

| Classification | | Example | | | Comparative Example | | | | | |
|---|---|---|---|---|---|---|---|---|---|---|
| | | 1 | 2 | 3 | 1 | 2 | 3 | 4 | 5 | 7 |
| Vulcanization characteristics | T5 (min) | 2.3 | 2.1 | 2.5 | 2.8 | 2.9 | 3.0 | 3.1 | 4.0 | 3.8 |
| | $V_{max}$ (kgf · cm) | 62.5 | 64.3 | 65 | 50 | 49 | 55 | 52 | 46 | 55 |
| Mechanical properties | TS (kgf/cm$^2$) | 225 | 246 | 235 | 196 | 192 | 205 | 164 | 150 | 190 |
| | Elongation ratio (%) | 387 | 377 | 390 | 301 | 321 | 389 | 340 | 312 | 350 |
| | 300% modulus | 174 | 185 | 190 | 157 | 150 | 166 | 143 | 137 | 160 |

As shown in Table 1, the present invention, in which α,β-unsaturated nitrile monomer was added once to twice within 1.5 to 3.5 hours and then once to twice within 4 to 6 hours after polymerization initiation, exhibits high MSR value (See. long chain branch fraction) and improvement regarding a uniform AN composition (See. result of Δ ACN), when compared to Comparative Examples 1, 2, 3, 4, and 5 which were not divided added as described above.

In addition, the present invention using alkyl thiol exhibits fast and high vulcanization properties, and physical properties, when compared to Comparative Example 4, 5, and 6 using conventional mercaptan.

Furthermore, the present invention using the fatty acid exhibits improvement in vulcanization rate and physical properties, when compared to Comparative Example 7 using a rosin acid emulsifier.

Additional Experimental Examples

Example 1 (designated by "three times" in FIG. 1), Example 3 (designated by "twice" in FIG. 1), Comparative Example 2 (designated by "once" in FIG. 1), and Comparative Example 3 (designated by "batch" in FIG. 1) were carried out in the same manner, except that 32 wt % acrylonitrile and 68 wt % 1,3-butadiene were used, in particular, 27 wt % acrylonitrile was used at an initial step of polymerization and 5 wt % acrylonitrile was equally divided added during polymerization. Acrylonitrile content change according to a conversion rate during each of polymerization reactions was measured according to an N-content analysis method using an element analyzer (EA). Results are illustrated in FIG. 1.

Additional Experimental Example of Example 1 is designated by "three times" in FIG. 1, Additional Experimental Example of Example 3 is designated by "twice" in FIG. 1, Additional Experimental Example of Comparative Example 2 is designated by "once" in FIG. 1, and Additional Experimental Example of Comparative Example 3 is designated by "batch" in FIG. 1.

As a results, as illustrated in FIG. 1, it can be confirmed that a curve of "twice" and a curve of "three times" according to the present invention exhibits an acrylonitrile content change (LAN) of 2 or less until polymerization termination at a conversion rate of 80%, but a curve designated by "batch" as Additional Experimental Example of Comparative Example 3 or a curve designated by "once" as Additional Experimental Example of Comparative Example exhibits a content change (LAN) exceeding 2 until polymerization termination at a conversion rate of 80%.

What is claimed is:

1. A nitrile rubber consisting of
   18 to 29 wt % of at least one α,β-unsaturated nitrile monomer,
   82 to 71 wt % of at least one conjugated diene monomer,
   0.5 to 5 parts by weight of a fatty acid based on 100 parts by weight of the nitrile rubber;
   0.01 to 10 parts by weight of alkyl thiol based on 100 parts by weight of the nitrile rubber; and
   0.01 to 1 part by weight of oil-soluble peroxide based on 100 parts by weight of the nitrile rubber
   wherein the α,β-unsaturated nitrile monomer is at least one selected from acrylonitrile, methacrylonitrile, fumaronitrile, α-chloronitrile or α-cyanoethyl acrylonitrile,
   wherein the conjugated diene monomer is at least one selected from 1,3-butadiene, 2,3-dimethyl-1,3-butadiene, 2-ethyl-1,3-butadiene, 1,3-pentadiene, or isoprene,
   wherein ΔACN ranges from 2 to 3, and Mooney stress-relaxation rate (MSR) of the nitrile rubber measured with a shearing-disc viscometer according to ISO 289-4:2003 E at 100° C. is in the range of 0.35 to 0.383.

2. The nitrile rubber according to claim 1, wherein the fatty acid is at least one selected from the group consisting of oleic acid, rosin acid, lauric acid, myristic acid, palmitic acid, stearic acid, naphthalene sulfonic acid, and eicosanoic acid.

3. The nitrile rubber according to claim 1, wherein the alkyl thiol comprises 12 to 16 carbon atoms, and three or more tertiary carbon atoms comprising sulfur bond to one of the tertiary carbon atoms.

4. The nitrile rubber according to claim 3, wherein
   the alkyl thiol is at least one selected from the group consisting of 2,2,4,6,6-pentamethylheptane-4-thiol and 2,2,4,6,6,8,8-heptamethylnonane-4-thiol.

5. The nitrile rubber according to claim 1, wherein
   the oil-soluble peroxide is at least one selected from the group consisting of benzoyl peroxide, di-t-butylperoxide, azobisisobutyronitrile, tributyl hydroperoxide, dicumyl peroxide, t-butyl perbenzoate, cumene hydroperoxide, t-butyl peroctoate, methyl ethylketone peroxide, 2,5-dimethyl-2,5-di(t-butylperoxy)hexane, p-menthane hydroperoxide, and lauryl peroxide.

6. A vulcanizable mixture comprising the nitrile rubber according to claim 1 and at least one crosslinker.

7. A molded product formed from the vulcanizable mixture according to claim 6.

8. The molded product according to claim 7, wherein the molded product has a tensile strength of 225 to 246 kgf/cm2 and an elongation ratio of 377 to 387%, and a 300% modulus of 174 to 185, wherein the tensile strength, elongation ratio, and 300% modulus are measured at a vulcanised state according to DIN 53 504.

9. The molded product according to claim 7, wherein the molded product is seals, caps, hoses or diaphragms, O-ring seals, flat-type seals, corrugated seal rings, seal sleeves, seal caps, dust block caps, plug seals, insulation hoses, oil cooler hoses, inhalation hoses, servo control hoses, or pump diaphragms.

\* \* \* \* \*